(12) United States Patent
Zitzmann

(10) Patent No.: US 6,653,926 B1
(45) Date of Patent: Nov. 25, 2003

(54) PLATINUM TEMPERATURE SENSOR AND ITS METHOD OF PRODUCTION

(75) Inventor: Heinrich Zitzmann, Lauf an der Pegnitz (DE)

(73) Assignee: Sensotherm Temperatursensorik GmbH, Nuremberg (DE)

( * ) Notice: Subject to any disclaimer, the term of this patent is extended or adjusted under 35 U.S.C. 154(b) by 0 days.

(21) Appl. No.: 09/889,298

(22) PCT Filed: Jan. 12, 2000

(86) PCT No.: PCT/EP00/00178
§ 371 (c)(1),
(2), (4) Date: Aug. 20, 2001

(87) PCT Pub. No.: WO00/42402
PCT Pub. Date: Jul. 20, 2000

(30) Foreign Application Priority Data

Jan. 14, 1999  (DE) .......................................... 199 01 184

(51) Int. Cl.⁷ ................................................. H01C 7/10
(52) U.S. Cl. ........................................... 338/25; 338/28
(58) Field of Search ..................................... 338/25, 28

(56) References Cited

U.S. PATENT DOCUMENTS

| | | | | |
|---|---|---|---|---|
| 4,339,719 A | * | 7/1982 | Rhines et al. .............. | 324/446 |
| 4,901,051 A | * | 2/1990 | Murata et al. ................. | 338/25 |
| 4,952,904 A | * | 8/1990 | Johnson et al. ............... | 338/36 |
| 5,181,007 A | * | 1/1993 | Friese et al. ................ | 338/309 |
| 5,406,246 A | * | 4/1995 | Friese et al. ............... | 338/22 R |
| 5,430,428 A | * | 7/1995 | Gerblinger et al. ......... | 338/309 |
| 5,473,304 A | * | 12/1995 | Friese et al. ................... | 338/23 |
| 5,735,606 A | * | 4/1998 | Tani et al. ................... | 374/185 |
| 5,831,512 A | * | 11/1998 | Wienand et al. .............. | 338/25 |

FOREIGN PATENT DOCUMENTS

| | | |
|---|---|---|
| DE | 76 201 727 | 12/1976 |
| DE | 37 33 192 C | 10/1988 |
| DE | 38 29 764 A | 3/1989 |
| DE | 44 45 243 A | 6/1995 |
| EP | 0 772 031 A1 | 5/1997 |
| EP | 0 832 487 A | 4/1998 |
| GB | 2 171 253 A | 8/1986 |
| WO | WO92/15101 A1 | 9/1992 |

OTHER PUBLICATIONS

M. Heuhauser et al., "Fugen von Technischen Keramiken mit Keramik–Grufolien", fachberichte/Papers, DKG 72 (1995) No. 1–2, pp 17–20.

* cited by examiner

*Primary Examiner*—Karl D. Easthom
(74) *Attorney, Agent, or Firm*—Dougherty, Clements & Hofer

(57) ABSTRACT

A Platinum temperature sensor comprises a ceramic substrate and a platinum thin-film resistor applied to said ceramic substrate, a ceramic cover layer and a connecting layer generated from a ceramic green layer by pressure and temperature treatment. The ceramic cover layer is connected with the ceramic substrate in such a way via the connecting layer that the platinum thin-film resistor is sealingly encapsulated with regard to the environment.

8 Claims, 1 Drawing Sheet

PLATINUM TEMPERATURE SENSOR AND ITS METHOD OF PRODUCTION

PCT/EP00/00178 filed on Jan. 12, 2000, with the European Patent Office.

BACKGROUND OF THE INVENTION

1. Field of the Invention

The present invention relates to a platinum temperature sensor and a method for producing the same, and in particular to a platinum temperature sensor in the case of which a platinum thin-film resistor, which is applied to a ceramic substrate, is used for temperature detection.

2. Description of Prior Art

A known platinum temperature sensor is shown in FIG. 3. In this known platinum temperature sensor, a platinum thin-film resistor 2 is applied to a ceramic substrate 4 which normally consists of aluminium oxide $Al_2O_3$. In the area in which the platinum thin-film resistor 2 is formed, a protective glaze 6 is provided on the surface of the ceramic substrate 4. The platinum layer, in which the platinum thin-film resistor 2 is normally formed in a meandering shape, is additionally patterned so as to include connecting areas 8 having lead wires 10 connected thereto in an electrically conductive manner for taking the sensor signal. For fixing the lead wires 10, a glaze 12 is provided.

The field of use of the platinum temperature sensor, which is shown in FIG. 3 and which is implemented in thin-film technology, is normally limited to 600° C. In the last few years, there has, however, been an increasing demand for an embodiment that can be used for higher operating temperatures, which may exceed 1,000° C. In the field of high-temperature sensors considerable efforts have therefore been made to provide platinum temperature sensors which are suitable to be used in such high temperature ranges. By purposefully selecting the composition of the protective glaze 6, it has already been possible to find satisfactory solutions for some cases of use, whereas in very particular fields of application, e.g. in special cases of use in the field of automotive engineering, the results do not satisfy all requirements. For example, the long-term stability of temperature sensors of the type described hereinbefore, especially when they have applied thereto a certain measurement current, which may e.g. be 5 mA, is not sufficiently guaranteed at the high temperatures occurring, viz. temperatures in the range of 800° C. and 1,000° C., since the protective glazes used may be decomposed electrochemically by the necessary measurement current at these high temperatures. The resultant material migration has a negative influence on the properties of the platinum so that the stability of the sensors and, consequently, the measuring accuracy are impaired.

By purposefully selecting the composition of the protective glazes, improvements could be achieved to a certain extent, but it was impossible to find protective glazes that withstand the electrochemical decomposition by the measurement current in the case of continuous loads in a temperature range of 1,000° C. or more than 1,000° C.

From the article "Fügen von Technischen Keramiken mit Keramik-Grünfolien" by M. Neuhäuser et al., sfi/Ber. DKG 72 (1995) Nr. 1-2, methods for joining technical ceramics are known wherein ceramics green foils are used to connect two ceramic layers. A prerequisite for the joining method described there is that the sintering temperature of the ceramic green foil is below the sintering temperature of the ceramic to be jointed.

A temperature sensor having a platinum resistance layer, which is applied to a ceramic substrate and encapsulated by a glaze, is disclosed in DE 7629727 U1.

From De 37 33 192 C1 a PTC-temperature sensor is known herein a platinum resistor formed by means of a platinum thick-film technique is arranged between two ceramic green foils and an interlaminar binder layer, whereupon the two foils are laminated together by use of a pressure and a risen temperature and are sintered after that.

In DE 4445243 A1 a temperature sensor is described wherein three unprocessed ceramic substrates are laminated together, pressed and fired at 1.600° C. in order to form a uniform piece. Before laminating a platinum resistor is arranged between two of the ceramic substrates.

SUMMARY OF THE INVENTION

It is the object of the present invention to provide a platinum temperature sensor which supplies reliable measurement results even in the case of continuous loads in a high temperature range, and a method for producing such a platinum temperature sensor.

According to a first aspect of the invention this object is achieved by a platinum temperature sensor comprising:

a ceramic substrate;

a platinum thin-film resistor applied to the ceramic substrate;

a ceramic cover layer; and a connecting layer produced from a ceramic green sheet by pressure and temperature treatment, by means of which the ceramic cover layer is connected with the ceramic substrate in such a way that the platinum thin-film resistor is sealingly encapsulated with regard to the environment.

According to a second aspect of the invention this object is achieved by a platinum temperature sensor comprising:

a ceramic substrate;

a platinum thin-film resistor applied to the ceramic substrate;

a ceramic cover layer; and a connecting layer made of a glaze that is applied to the ceramic substrate in a boarder area surrounding the platinum thin-film resistor by means of which the ceramic cover layer is connected with the ceramic substrate in such way that the platinum thin-film resistor is sealingly encapsulated with regard to the environment.

According to a third aspect of the invention, this object is achieved by a method for producing a platinum temperature sensor comprising the steps of:

providing a fired ceramic substrate with a platinum thin-film resistor applied to the main surface thereof;

applying a connecting layer made of a ceramic green layer to the main surface of the ceramic substrate; and applying a fired ceramic cover layer to the connecting layer in such a way that the platinum thin-film resistor is sealingly encapsulated with regard to the environment by subjecting the ceramic green layer to a temperature treatment under application of pressure in such a way that the ceramic substrate and the ceramic cover layer will be connected.

The present invention is based on the knowledge that ceramic materials, especially aluminium oxide $Al_2O_3$ are insensitive to the above-described current induced decomposition, and thus this material that in addition is used in thin-film platinum temperature sensors as substrate material for the platinum film can advantageously also be used as protective material for capsulation of the platinum film layer. Thus, the problems of electrochemical decomposition and the connected deterioration of properties of the platinum temperature sensors are prevented, even when the protective cover is realized from a ceramic material.

On the one hand, the structured platinum film in the inventive platinum temperature sensor is therefore sufficiently protected against mechanical and chemical environmental influences. On the other hand the inventive platinum temperature sensor supplies reliable measurement results even in the case of continuous loads in a high temperature range of for example 1000° C. or more than 1000° C., since the above-described disadvantageous decomposition phenomenons do not occur in the case of the inventive platinum film temperature sensor.

In the inventive platinum temperature sensor the connecting layer is either applied to the whole area of the ceramic substrate provided with the platinum thin-film resistor or alternatively only on a border area of the same, so that the platinum thin-film resistor is surrounded by the connecting layer. If the connecting layer is only provided on the border area it is preferable to provide a sealing layer that can be made of glass, for example, on the side edges of the resulting layer structure. However, such a layer can also be provided when the connecting layer is applied to the whole area.

BRIEF DESCRIPTION OF THE DRAWINGS

Preferred embodiments of the present invention will be explained below in detail referring to the enclosed drawings. They show.

DESCRIPTION OF PREFERRED EMBODIMENTS OF THE INVENTION

Figure 1:
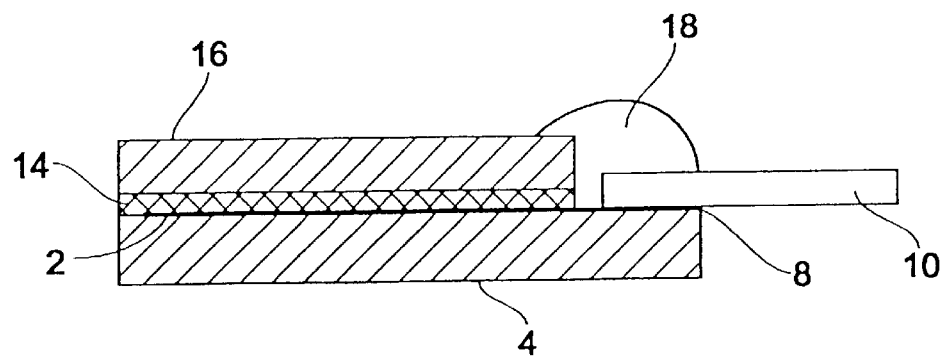
FIG. 1: a schematic cross-sectional view of a platinum temperature sensor according to the present invention.

First, referring to FIG. 1, a first embodiment of a platinum temperature sensor according to the present invention is described in detail. The platinum temperature sensor comprises a ceramic substrate that consists of $Al_2O_3$ in preferred embodiments on which a structured platinum layer is applied defining a platinum resistor trace 2 and connecting areas 8. A lead wire 10 can be electrically conductive connected with the connecting areas 8. A ceramic cover layer 16 which is also made from $Al_2O_3$ in the preferred embodiments of the present invention is applied on the surface of the ceramic substrate 4 on which the platinum resistor trace is provided via a connecting layer 14, which consists also of $Al_2O_3$ in the preferred embodiments of the present invention. Further, in FIG. 1 a glass ceramic 18 is illustrated that serves for fixing the lead wire.

It is preferable to use the same material for the cover layer 16 that is used for the ceramic substrate 4. However, a similar material can be used. The cover layer 16 can have the same thickness as the ceramic layer or a smaller thickness, for example 10 to 20% thinner, as long as the thickness of the cover layer can obtain a sufficient protective effect against adverse environmental influences. The connecting layer can have a small thickness since the protective effect for the platinum film with regard to the outer atmosphere is achieved by the thicker cover layer 16.

First, for producing the platinum temperature sensor according to the invention the fired ceramic substrate 4 that is a $Al_2O_3$-substrate in the preferred embodiments of the present invention is supplied with the platinum resistor trace 2 provided thereon. Subsequently, a very thin ceramic green layer with a thickness of for example 0.1 to 0.2 mm is supplied at least in the area of the platinum resistor trace 2. This connecting layer is preferably an $Al_2O_3$ green layer. Subsequently the fired cover layer 16, preferably also a $Al_2O_3$ layer, is applied to the green layer. This total layer construction will then be fired with very high temperatures under an additional outer pressure that can for example be generated by an additional ceramic plate. By this firing procedure the two ceramic plates, i.e. the ceramic substrate 14 and the cover layer 16 are tightly connected via the foil 14. Thus, the platinum thin-film resistor 2 is tightly closed against the outer atmosphere.

Thus, the present invention provides a platinum temperature sensor that ensures a secure protection of the platinum thin-film resistor against penetration of foreign material from the environment even in high temperature ranges, wherein no chemical decomposition influences by the measurement current necessary for operating the temperature sensor need to be feared.

It is not possible to apply the ceramic cover layer directly to the ceramic substrate by means of screen-printing, like it is done when using glazes as protective layer, for example. IF $Al_2O_3$ is used as a cover layer this procedure cannot be applied since the melting point for $Al_2O_3$ is much to high, namely above the melting of the platinum and would further also melt the carrier substrate.

Even when the whole cover layer is applied as a green layer, wherein green layer means a ceramic with binding agents volatilizing in the firing procedure, problems arise since this green layer is subject to a certain shrinkage, wherein the cover layer would not have the required impermeability due to shrinkage cracks. The above-mentioned shrinkage becomes even more apparent the thicker the foil is. On the other hand, a certain thickness in the range of 0.3 to 0.5 mm is necessary in order to achieve a sufficient protective effect against adverse environmental influences with the mentioned high temperatures of 800° C. to 1000° C. or more.

Figure 2:
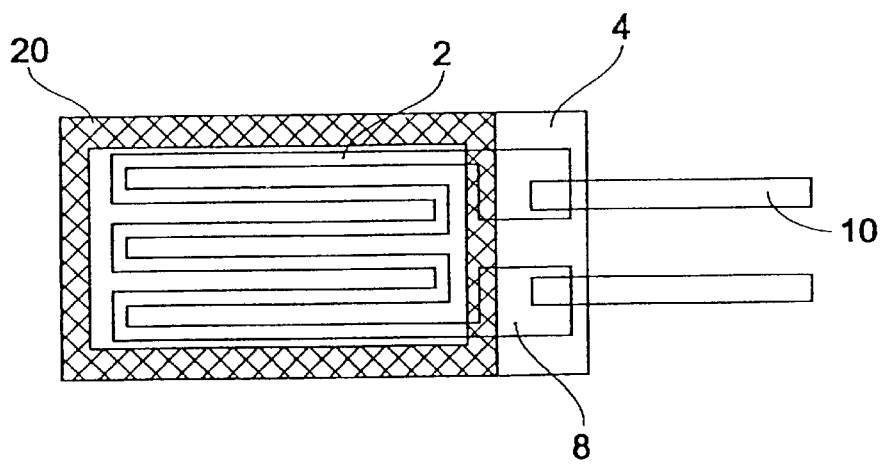
FIG. 2: a schematic top view of a platinum temperature sensor according to the present invention.
Figure 3:
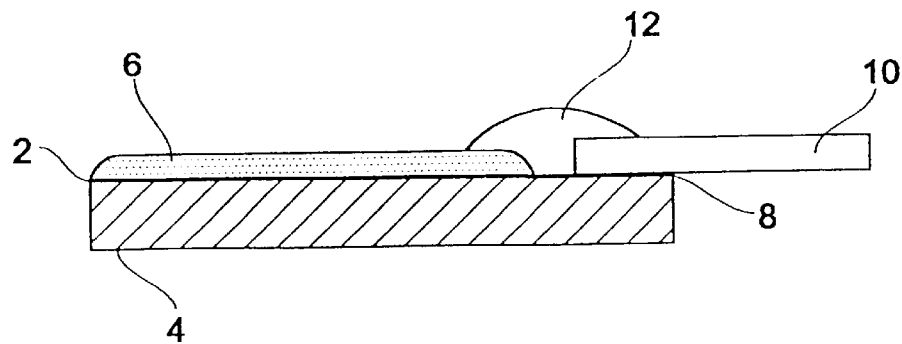
FIG. 3: a schematic cross sectional view of a known platinum temperature sensor.

In FIG. 2 a schematic top-view of an alternative embodiment of A platinum temperature sensor according to the invention is illustrated. In FIG. 2 again the ceramic substrate 4 servicing as a carrier and the platinum layer structured thereon that defines a platinum thin-film resistor 2 and connecting areas 8 shown. Further two lead wires 10 each connected with one of the connecting areas 8 are illustrated. However, in the embodiment shown in FIG. 2 the connecting layer 10 is not applied to the whole area of the surface of the ceramic substrate 4 and the platinum thin-film resistor 2 but only in a border area surrounding the platinum thin-film resistor 2. In this embodiment the platinum thin-film resistor is not coveted by the connecting layer. By means of this connecting layer 20 surrounding the platinum thin-film resistor 2 a cover layer (not shown in FIG. 2) ill now be connected with the ceramic substrate 4, so that again the platinum thin-film resistor 2 is sealingly encapsulated with regard to the environment. In this embodiment it is preferred to provide an additional sealing layer made of glass, for example, on the perpendicular outer edges formed by the layer structure.

In the embodiment shown in FIG. 2 either also a $Al_2O_3$-foil can be used as a connecting layer 20, while alternatively a protective glaze for sealing connection, i.e. fusion of the carrier substrate with the cover foil, can be used a connecting layer instead of the foil. Even when the protective glaze is used a connecting layer 20 the current carrying platinum resistor trace 2 has no contact to the glaze layer 20, so that the above-described decomposition phenomenons do not occur in this case. Using a glaze for the connecting layer 20 can offer advantages for the production and can be used for up to 1000° C. if a high melting glaze with a melting temperature of more than 1.300° C. is used.

The connecting layers 14 in FIG. 1 and 20 in FIG. 2 used according to the invention can alternatively be replaced by a ceramic paste printed on by a screen-printing method. In this case a ceramic paste is printed onto the structured ceramic substrate coated with the structured platinum film by screen-printing and covered with the ceramic cover plate after pre-drying. Subsequently under application of pressure a firing is performed in order to connect ceramic substrate and ceramic cover layer. The ceramic paste can consist of a pasted mixture of several ceramic powders and quartz powders, for example $Al_2O_3$, MGO, $SiO_2$.

Thus, the present invention provides a platinum temperature sensor, which on the one hand provides a secure protection of the platinum film resistor against outer influences and on the other hand exhibits no deterioration of precision even in the case of continuous loads in a high temperature range.

The platinum temperature sensor according to the invention can preferably be produced by wafer processing, with the exception of mounting the lead wires and fixing them in such a way that a plurality of platinum temperature sensors can be produced from one ceramic wafer. After dicing-up the individual platinum temperature sensors the above-mentioned sealing layer can be applied to the respective perpendicular cutting edges.

What is claimed is:

1. Platinum temperature sensor comprising:
    a fired ceramic substrate;
    a platinum thin-film resistor applied to the ceramic substrate;
    a fired ceramic cover layer; and
        a connecting layer by means of which the fired ceramic cover layer is connected with the fired ceramic substrate in such a way that the platinum thin-film resistor is sealingly encapsulated with regard to the environment,
        wherein the connecting layer is produced by arranging a ceramic green sheet between the fired ceramic cover layer and the fired ceramic substrate and by subjecting the ceramic green sheet to a temperature treatment under application of pressure.

2. Platinum temperature sensor according to claim 1 wherein the connecting layer is formed as a continuous face on the ceramic substrate and the platinum thin-film resistor.

3. Platinum temperature sensor according to claim 1 wherein the connecting layer is applied in a frame-like shape in a border area surrounding the platinum thin-film resistor on the ceramic substrate.

4. Platinum temperature sensor according to claim 1 wherein the connecting layer is generated from an $Al_2O_3$ green-layer.

5. Platinum temperature sensor according to claim 1 wherein the ceramic substrate is made of $Al_2O_3$.

6. Platinum temperature sensor according to claim 1 wherein the ceramic cover layer is made of $Al_2O_3$.

7. Platinum temperature sensor according to claim 1 wherein a sealing cover is applied to the outer peripheral edges of the layer structure consisting of ceramic substrate, connecting layer and ceramic cover layer.

8. Platinum temperature sensor according to claim 7 wherein the sealing cover is made of glass.

* * * * *